Figure 1:
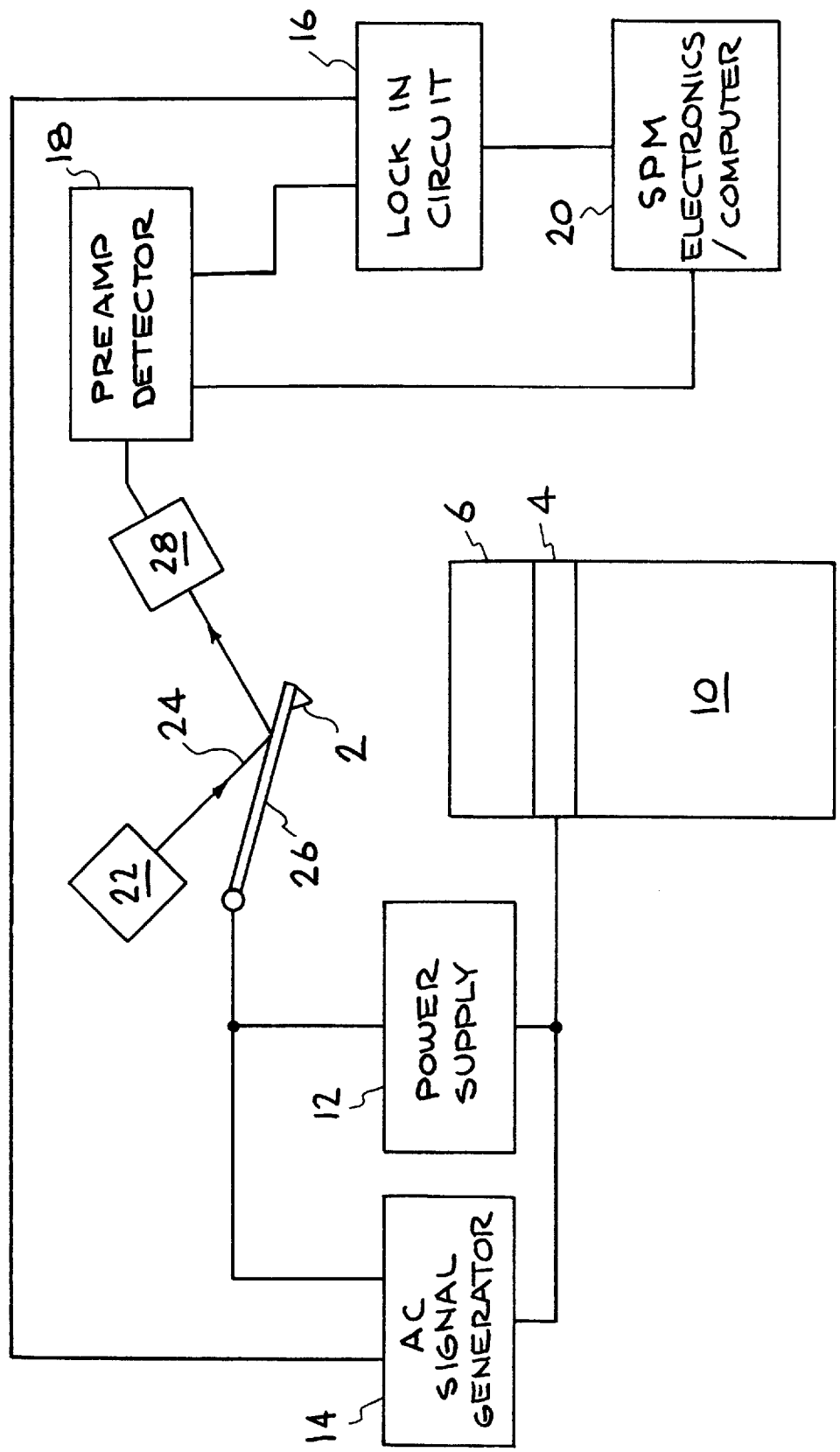

United States Patent

Hu et al.

[11] Patent Number: 5,880,360
[45] Date of Patent: Mar. 9, 1999

[54] METHOD FOR IMAGING LIQUID AND DIELECTRIC MATERIALS WITH SCANNING POLARIZATION FORCE MICROSCOPY

[75] Inventors: Jun Hu, Berkeley; D. Frank Ogletree; Miguel Salmeron, both of El Cerrito, all of Calif.; Xudong Xiao, Kowloon, China

[73] Assignee: The Regents, University of California, Oakland, Calif.

[21] Appl. No.: 871,424

[22] Filed: Jun. 9, 1997

Related U.S. Application Data

[62] Division of Ser. No. 476,441, Jun. 7, 1995.

[51] Int. Cl.[6] .................................................. G01B 7/34
[52] U.S. Cl. ........................................... 73/105; 250/307
[58] Field of Search ............................... 73/105; 250/306, 250/307

[56] References Cited

U.S. PATENT DOCUMENTS

| | | | |
|---|---|---|---|
| 5,128,544 | 7/1992 | Iwatsuki | 250/306 |
| 5,136,162 | 8/1992 | Miyamoto et al. | 250/306 |
| 5,281,814 | 1/1994 | Weiss et al. | 250/307 X |
| 5,283,437 | 2/1994 | Greschner et al. | 250/306 |
| 5,397,896 | 3/1995 | Weiss et al. | 250/306 |
| 5,400,647 | 3/1995 | Elings | 73/105 |
| 5,468,959 | 11/1995 | Tohda et al. | 250/306 |
| 5,476,006 | 12/1995 | Fujii et al. | 250/306 X |
| 5,495,109 | 2/1996 | Lindsey et al. | 250/306 |
| 5,504,366 | 4/1996 | Weiss et al. | 250/306 X |
| 5,559,328 | 9/1996 | Weiss et al. | 250/306 |

*Primary Examiner*—Thomas P. Noland
*Attorney, Agent, or Firm*—Paul R. Martin

[57] ABSTRACT

The invention images dielectric polarization forces on surfaces induced by a charged scanning force microscope (SFM) probe tip. On insulators, the major contribution to the surface polarizability at low frequencies is from surface ions. The mobility of these ions depends strongly on the humidity. Using the inventive SFM, liquid films, droplets, and other weakly adsorbed materials have been imaged.

6 Claims, 5 Drawing Sheets

$$\sin \alpha = \frac{h}{a + \frac{4h^2}{a}}$$

METHOD FOR IMAGING LIQUID AND DIELECTRIC MATERIALS WITH SCANNING POLARIZATION FORCE MICROSCOPY

This is a divisional of copending application Ser. No. 08/476,441 filed on Jun. 7, 1995.

This invention was made with U. S. Government support under Contract No. DE-AC03-76SF00098 between the U.S. Department of Energy and the University of California for the operation of Lawrence Berkeley Laboratory. The U. S. Government may have certain rights in this invention.

BACKGROUND OF THE INVENTION

1. Field of the Invention

This invention relates generally to imaging of liquids, liquid films, liquid droplets, weakly bound particles on surfaces, and surfaces of thick dielectric samples using scanning force microscopy (SFM).

2. Description of Related Art

Atomic force and scanning force microscopes have been used to image solid surfaces with regions of electrostatic charge or dielectric material using metal or metal-coated cantilever probe tips. However no technique has been successfully used, including scanning force microscopy and atomic force microscopy, to image the nanometer-scale structure of liquid films, surfaces, and adsorbates. It is important to understand the growth of thin films of water because water films alter the adhesion and lubricating properties of surfaces and the reactivity of solids with ambient gas molecules. Additionally, water is a common solvent and cleaning agent. A method to study the growth of thin films of water would be important for physics, chemistry, and biology. In chemistry, the contact angle of water is used to measure the chemical activity of the surface. In biological processes, water films are critical for ion transport. In the semiconductor industry, water is used to wash off surface residues including and similar to reactants and acids. It is very important to know of the presence of residual liquid residues on the surface. Several studies have been recently devoted to the layering and orientation of water molecules on surfaces (Q. Du, E. Freysz, Y. R. Shen, *Phys. Rev. Lett.* 72, 238, 1994; J. D. Porter and A. S. Zinn, *J. Phys. Chem.* 97, 1190, 1993; J. N. Israelachvili, *Chem. Scr.* 25, 7, 1985; *AC. Chem. Res.* 20, 415, 1987; J. Glosli and M. Philpott, *Proceedings of the Symposium on Microscopic Models of Electrode-Electrolyte Interface, Electrochem. Soc.* 93–5, 90, 1993). Ice-like structures have been predicted for the first layers of water molecules, but no experimental evidence is available to validate the predictions. A method and apparatus to image water surfaces with nanometer resolution would make it possible to study many basic aspects of wetting, including condensation, evaporation and chemical reactions. With such a tool, the validity of growth models and the structure of the first layers could be investigated at the molecular level. If this type of tool were available it would also enable people to map the location of liquid droplets in the nanometer range.

Modern scanning force microscopes (SFM) like the scanning tunneling microscope (STM) and the atomic force microscope (AFM) can be used to obtain atomic-scale resolution of solid surfaces. SFM uses a probe tip attached to a spring, normally in the form of a lever or cantilever. Any of a number deflection sensor systems is used to measure displacement of the spring from its rest position under the influence of external forces, typically coming from the sample to be imaged.

SFM cantilever probe tips are available in a range of force constants (k), typically in the range between about 0.01 and 100 Newtons per meter (N/m). The resonant frequency (f) of the probe tip can typically range from 1 to 200 kHz. Probe tips are generally available with radii (R) of about 5 to about 0.01 micrometers ($\mu$m). Many materials have been used for probe tips, including tungsten, platinum, other metal alloys, and semiconductors such as silicon or silicon nitride. Diamond has also been used as a SFM probe material. Conductive coatings have been applied to otherwise non-conducting probe tips.

Sometimes the SFM cantilever probe is used as a null displacement sensor, where a feed back loop in the SFM apparatus applies a compensating force to balance external forces from the sample. Operated in this mode, the SFM cantilever probe is maintained in a position as close to its rest position as possible. As the probe is rastered across the sample, the magnitude of the force required to prevent the probe from deviating from its rest position is measured and plotted as a function of probe location over the sample. The resulting two-dimensional plot is the image obtained under constant distance constraints.

More frequently, however, the SFM cantilever probe is allowed to deflect in response to external sample forces and, as the probe scans the sample, the magnitude of the deflection is measured and plotted as a function of location over the sample. This two-dimensional plot is the image. There are many types of sensor systems that can be used to measure the displacement of the cantilever. One of the most popular is the optical lever, using a segmented or differential photo diode (G. Meyer and N. M. Amer, App. Phys. Lett. V 53, p 1045, 1988; G. Meyer and N. M. Amer, App. Phys. Lett. V 56, p 2101, 1990). Other types of displacement sensor systems include an optical interferometer which may be based on optical fiber technology, electron tunneling sensors, capacitance based sensors, and piezoresistive sensors that directly detect lever deflection.

An SFM can be operated in a contact mode or in a non-contact mode. In the contact mode, the probe tip is pushed against the sample surface so the surface and probe tip are in close mechanical contact. In the contact mode, the lateral spatial resolution is approximately the width of the contact, about 1 nm. In the non-contact mode the probe tip is typically 5 nm to 1000 nm from the surface, a great distance compared to atomic bond distances. The probe tip and sample surface interact by long range forces such as van der Waals, electrostatic and magnetostatic forces. If the probe tip and/or sample are submerged in a liquid, they may interact via variations in chemical or electrochemical potentials. In air the lateral resolution for a probe tip of radius R that is separated from the sample surface by a distance D, is about $(2 D R)^{1/2}$ if D is smaller than R. If D is larger than R, the lateral spatial resolution is about equal to D.

Because liquid surfaces will be disturbed in a contact mode, liquids must be imaged in the non-contact mode. The SFM is operated in the non-contact mode by measuring any of several parameters. The deflection or displacement of a cantilever probe is one common measurement parameter. Another is modulation of an AC signal applied to the probe. Alternatively, the probe tip can be mechanically vibrated, and the effect of sample interaction with the vibration measured. Monitoring the change in mechanical vibration measures force gradients rather than magnitude. For solid samples, it is also possible to make measurements in a hybrid mode, sometimes referred to as a "tapping" mode, wherein parameters measured for contact and non-contact imaging are combined.

Van der Waals forces are always present and can be used for imaging. However, because they are very weak (the force is about 1 nN at 10 Å distance for a 500 Å probe tip radius), close proximity of the probe tip to the surface is required. Such close positioning to a liquid surface results in jump-to-contact instabilities. Electrostatic forces have a much longer range and magnitude than van der Waals forces and can be easily used to perform non-contact imaging of both conducting and insulating materials.

To use SFM to measure the electrostatic forces resulting from a charge distribution in the sample, a voltage is applied to the probe tip and the repulsion or attraction of the sample to the charged probe tip is measured. The charge distribution on the sample can result from polarizing a dielectric material, depositing fixed or mobile point charges in or on a non conducting sample, presence of differentially conducting domains in a sample, or, for conductors—applying a charge to an electrically isolated conductor or connecting the conductor to an external potential. Electrostatic forces on the sample can be detected with insulating probe tips, however the charge state of an insulating probe tip is difficult to control or characterize so most SFM measurements of electrostatic forces are made using conducting probe tips. Electrostatic forces in the sample can be measured using either dc or ac technology. Imaging of electrostatic fields by SFM has also been referred to as "scanning capacitance microscopy" and "Maxwell Stress Microscopy".

Martin, Abraham, and Wickramasinghe describe use of an AFM with a sharp tungsten probe to measure electrostatic forces with a spatial resolution of about 1000 Å (Appl. Phys. Lett. V. 52, p 1103–5, 1988). When a voltage is applied between the probe tip and the conductive surface that is being imaged, the separation-dependent capacitance between the probe tip and sample creates a capacitive force that is dominant for separation distances larger than of a few tens of angstroms. This methodology is useful to image surface dielectric properties or electrostatic forces of conductive solids or very thin insulators (about 1000 Å) on a conductive substrate. The Martin et al. capacitive type measurements verified the conductor and dielectric pattern of microcircuit on a semiconducting wafer. The conducting elements of the microcircuit comprised the counter electrode. The counter electrode location within about 2,000 Å of the probe tip electrode was intrinsic to their measurement system because the conducting elements were an integral part of the sample that was being measured. Liquid samples could not be configured following their sample set-up.

Saurenbach and Terris describe a mode of AFM imaging for detection of static surface charge in a crystal of $Gd_2(MoO_4)_3$ (Appl. Phys. Lett. V 56, p 1703–5, 1990). For the probe they use an electrochemically etched tungsten wire with the last 50–100 $\mu$m of the wire bent at a right angle to form a cantilevered probe tip. The resonant frequency of the probe tip changes as a function of the electrostatic charge on the sample surface. As the probe tip scans the surface, its resonant frequency is measured to determine the location of static charge. The method of Saurenbach and Terris is limited to measurements of ferroelectric materials where domains are oriented by applying an electric field to the backside of the sample.

Free liquid surfaces cannot be studied using the techniques and apparatus described above. For liquids, if the probe tip comes into contact with the surface, strong capillary forces will cause the liquid to wet the probe tip and strongly perturb the liquid. In order to avoid bulging of the liquid surface that leads to wetting and capillary interaction, the probe tip must be kept at least several tens of angstroms from the imaging surface.

Electrostatic force microscopy has been used to study such properties, as capacitance, surface potential and charge or dopant distribution, in metal and semiconductor samples. It has also been used to deposit and image localized charges on thin film insulators. Although the dielectric properties of surfaces can be studied in this way, the activity in this direction has been limited to very thin, never more than about 2,000 Å, layers of insulating materials on conducting substrates.

In all of the scanning force microscopes currently in use the probe tip is polarized relative to a proximate ground or a counter electrode located at least within a couple of thousand angstroms of the probe tip. This limits the sample size to conductors and thin insulators.

In all known uses of SFM the probe and counter electrode have been closer than a few thousand angstroms. Current users of SFM place the probe tip within a few thousand angstroms of the sample surface. No-one has successfully imaged liquids using the conventionally configured SFM. It would be desirable to be able to image non-conducting samples with thickness greater than 0.2 $\mu$m. It would also be very desirable to image liquids on insulating substrates. It would be extremely desirable to be able to image bulk liquids, or inhomogeneous liquids with disturbing the surface topology. It would be further desirable to be able to image insulating particles on thick insulating samples.

II. SUMMARY OF THE INVENTION

This invention relates to scanning force microscopy. More particularly it relates to scanning force microscopes used to image non-conducting materials, weakly bound materials, and liquids. The invention relates to measuring and mapping the electric field from electrostatic charges in these materials and the field from molecular and atomic polarization induced in the materials. The invention is particularly useful to image samples in which the probe tip would disturb the sample surface if the tip and surface touched and in which the electrostatic forces are strong. The invention provides an apparatus and method to image samples of such materials.

III. SUMMARY DESCRIPTION OF THE DRAWINGS

FIG. 1: shows a block diagram of a scanning force microscope.

Figure 2:
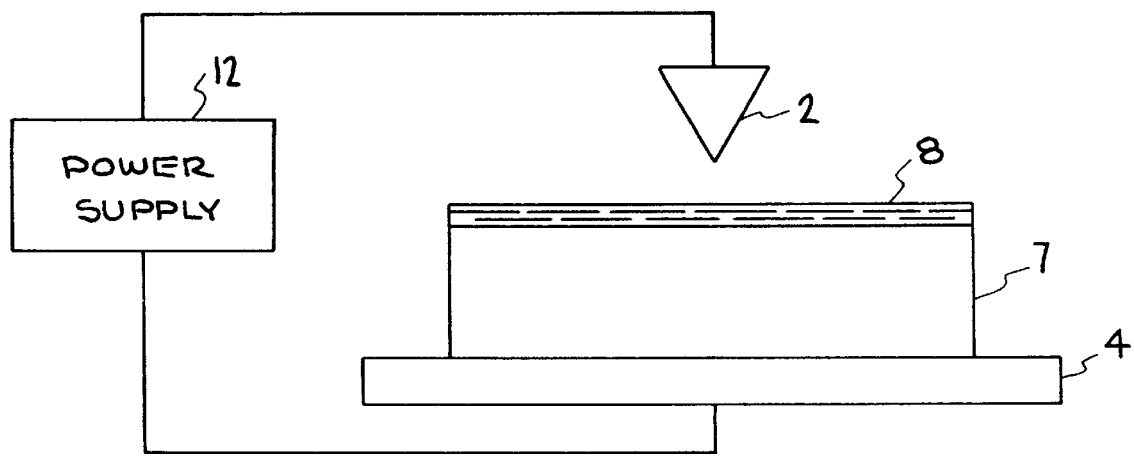

FIG. 2: illustrates the inventive electrode probe tip assembly for inducing and measuring polarization forces.

Figure 3:
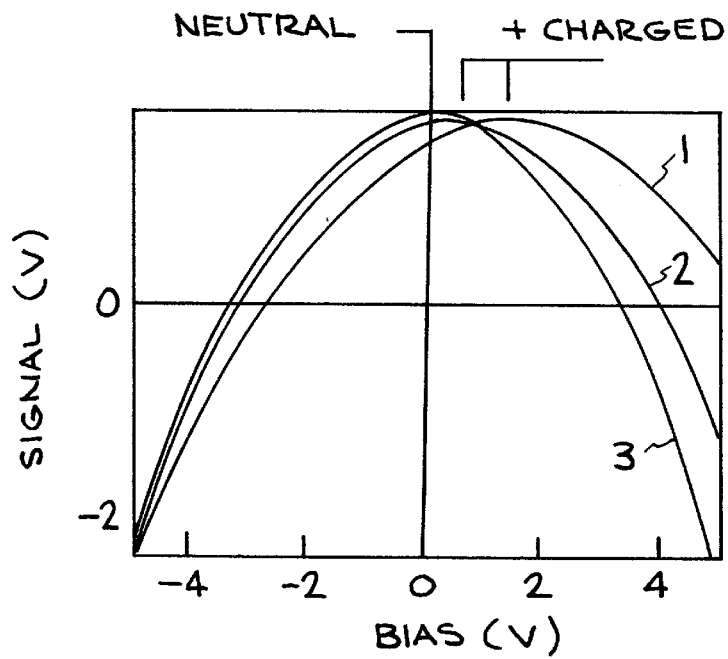

FIG. 3: shows the force as a function of tip bias voltage (counter electrode grounded) measured at three different points on a mica sample. The distance between the tip electrode and the counter electrode was about 0.5 mm. The parabolic shape of the curves shows the force due to the polarization of the dielectric mica sample. The highest point on the curve corresponds to the minimum tipsurface electric field. The bias voltage at this minimum is proportional to the surface charge. If this value is zero, the sample has no surface charge.

Figure 4:
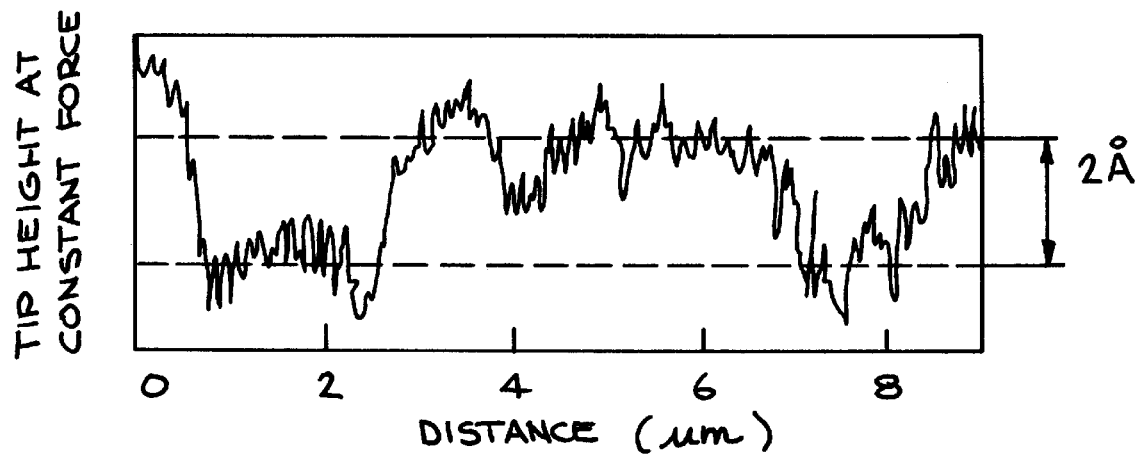

FIG. 4: shows a profile of one scan line from a constant force image of a water film on mica. The height variations of about 2 Å indicated changes in forces between the tip and the sample. Structural changes in the water film cause variations in its dielectric constant, which in turn cause variations in tip-sample forces. The distance between the tip electrode and the counter electrode was about 0.5 mm.

Figure 5:
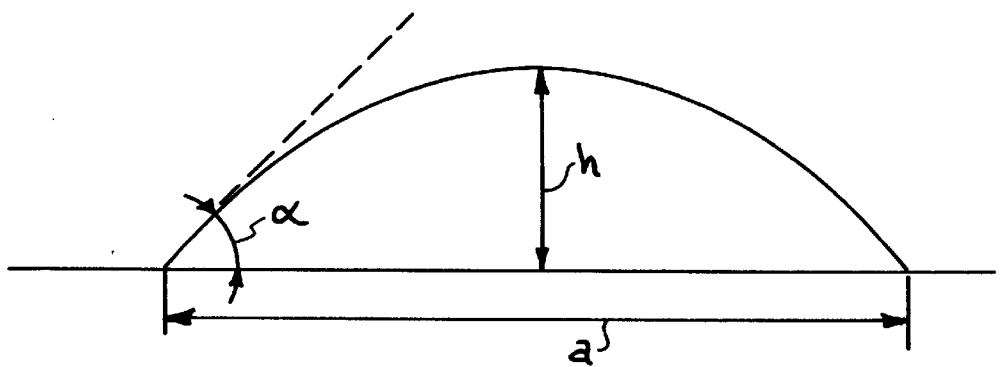

FIG. 5: shows critical parameters for measurement of contact angle.

Figure 6:
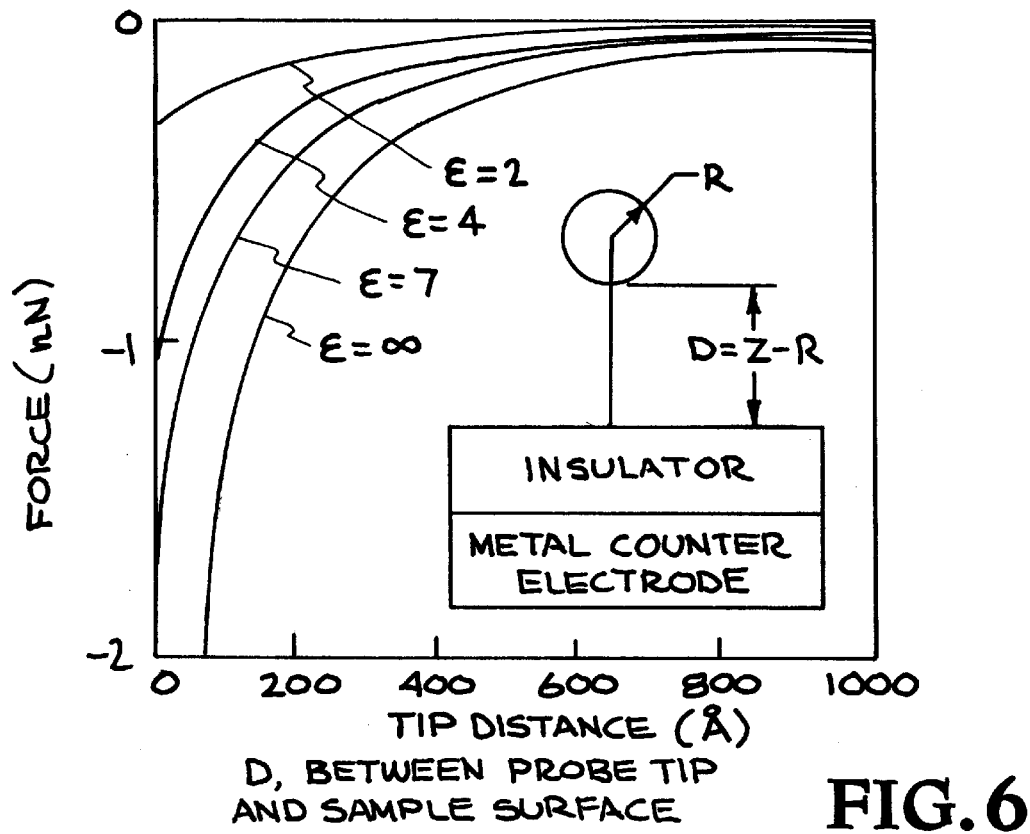

FIG. 6: illustrates the force dependence on probe tip radius and sample dielectric constants, determined by calculations.

Figure 7:
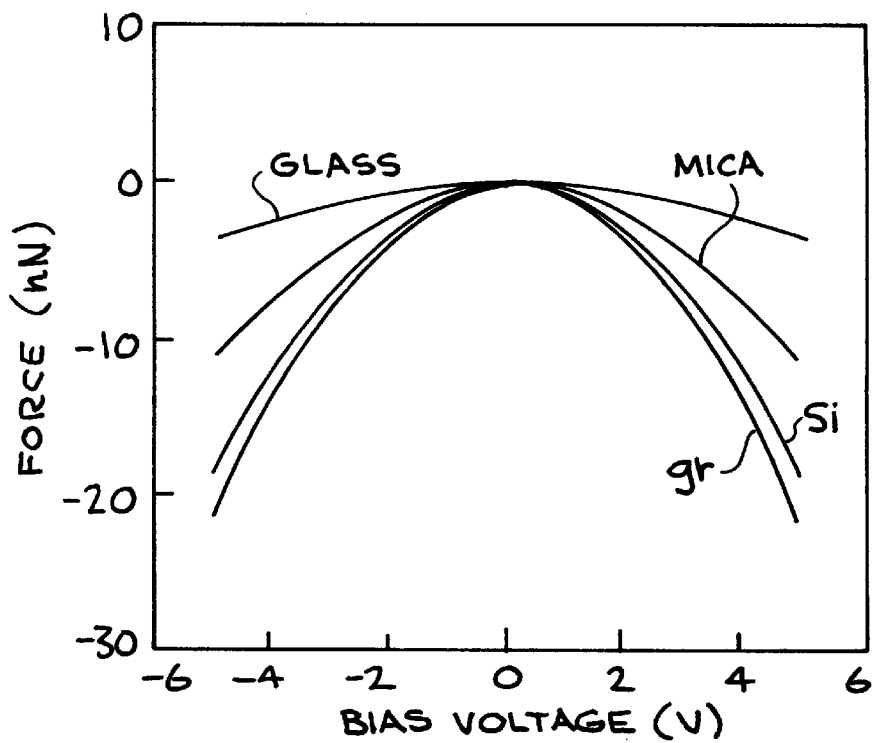

FIG. 7: shows the measured forces from samples having different dielectric constants.

Figure 8A:
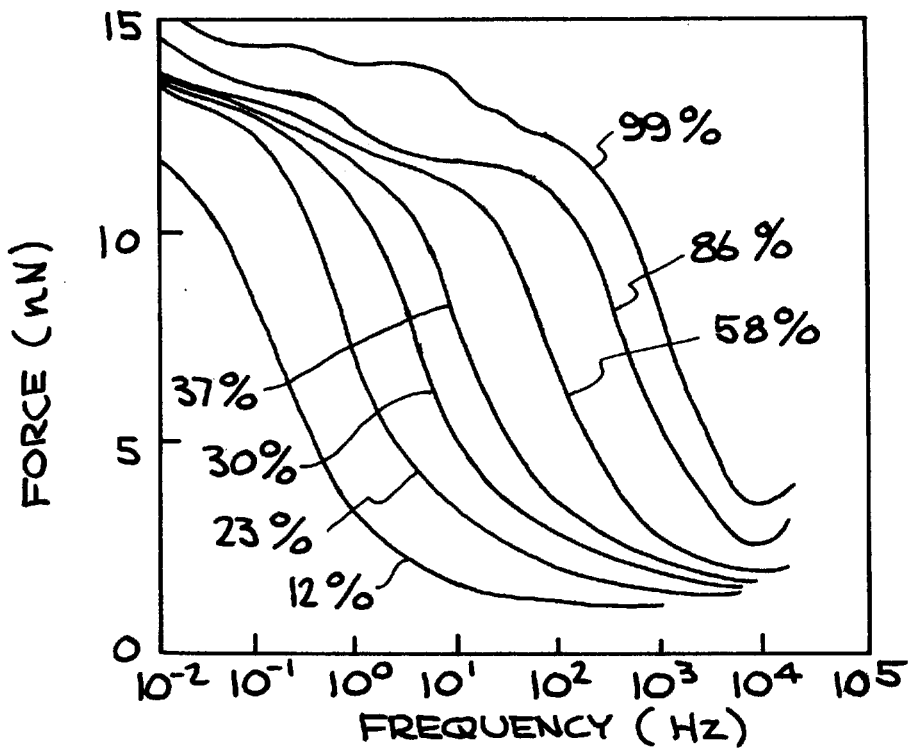

FIG. 8A: shows the measured frequency dependence of forces between the probe tip and the sample surface due to humidity-dependent ion transport on mica.

Figure 8B:
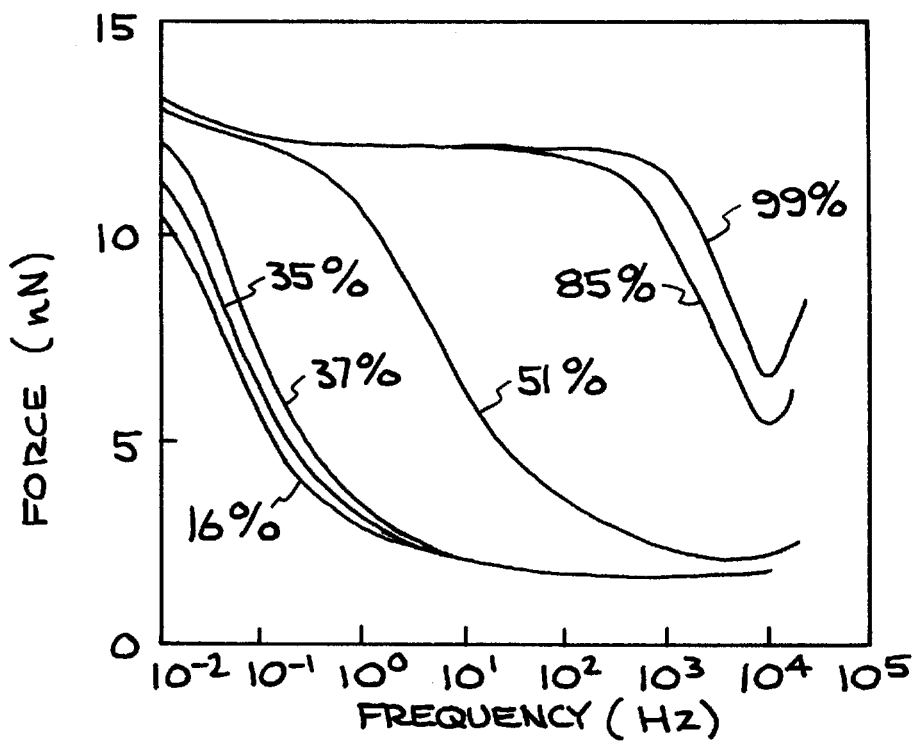

FIG. 8B: shows the measured frequency dependence of forces between the probe tip and the sample surface due to humidity-dependent ion transport on glass.

IV. DETAILED DESCRIPTION OF THE INVENTION

Definitions, abbreviations, and glossary

Å: Angstrom; counter electrode: a reference electrode for the voltage applied to the probe tip;

D: the distance between the probe tip and the sample surface;

d: the distance between the probe tip and the counter electrode;

R: the radius of the probe tip; lateral resolution: the apparent width of an isolated point feature;

N: Newton, a unit of force;

nN: nanoNewton;

pN: picoNewton;

RH: relative humidity;

μm: micrometer;

AFM: atomic force microscopy;

SFM: scanning force microscopy; this term includes atomic force microscopy;

SPFM: scanning polarization force microscopy.

In most electrostatic SFM arrangements there is a conducting probe tip of radius R that serves as a first electrode. It is separated from a second, or counter, electrode by a distance "d". Traditionally the counter electrode has been located under or within a very thin sample (about 2,000 Å or less) has been incorporated into the sample.

The present invention comprises a novel scanning-force-microscope probe tip electrode and counter electrode assembly. The inventive electrode assembly comprises a first electrode located at the SFM probe tip and at least one additional electrode located more than at least the SFM-probe-tip radius away from the first probe-tip electrode. The second electrode is called the counter electrode. For some applications additional electrodes may be used. In the preferred embodiment the SFM probe tip functions as a first electrode. The second or counter electrode is placed a distance d away from the probe tip electrode where d is at least greater than the probe tip radius, R. When a voltage of conventional magnitude for SFM, for example a DC voltage between about ±1 Volts (V) to about ±10 V, is applied between the electrodes, the electric force originating at the probe tip is great enough to induce polarization charges in the non-conducting or liquid sample. The counter electrode may be located 10 million Å, cm, m, or across the room as convenience dictates. The inventive electrode assembly relies on a force modeled from a point source at the probe tip. The field near the probe tip is approximately $(\Delta V/R) \cdot (1+R/d)$. The electric field strength is almost unaffected by changes in d or by the shape or location of the counter electrode. For example, if the probe tip radius is 30 nm and d is 1000 μm, increasing d 100 times will only slightly affect the measured electric field strength near the probe tip. By placing the counter electrode farther away from the probe tip, one can measure fields due to electrostatic charges on thick insulator samples located between the probe tip and a counter electrode. The sample can be tens of thousands or tens of millions of times thicker than R. It can be even thicker. The distance between the probe tip and the top surface of the sample, D, is less than R and much less than d. The inventive SPFM is used to image the surface of a thick dielectric sample with a lateral resolution of approximately $(2 D R)^*$ instead of approximately d.

The novel probe tip electrode assembly is placed in the scanning force microscope by any of a number of conventional means. The means include but are not limited to spring attachments, screws, glue, magnets, pressure latches, clamps, solder, and other means such as described in *Scanning force microscopy*, by Dror Sarid, New York: Oxford University Press, 1991.

The induced polarization in the sample varies as a function of the dielectric constant ε, so that variations in ε can be mapped or imaged. When ε is constant, the surface topography can be imaged with atomic monolayer vertical resolution. This new, inventive scanning force microscopy is called Scanning Polarization Force Microscopy, or "SPFM".

FIG. 1 shows a schematic of the inventive scanning polarization force microscope. The probe tip 2 serves as a first electrode. A counter electrode 4 is shown under a solid sample 6. The counter electrode, however, may be located much more remotely than shown. If convenient, it may literally be located across the room from the microscope. A sample 6 is the item to be mapped or imaged. The sample may be a non conducting material and may be of any thickness. Alternatively, if sample to be imaged is a liquid film, a electrically insulating material may be used as a substrate and placed in the same position that the solid sample 6 is shown in the schematic diagram. The substrate may be, for example, approximately 10,000,000 Å or several inches thick. The thickness of the sample or substrate does not affect the inventive SPFM's imaging capability. The sample liquid film 8 is placed on the substrate for imaging. The sample liquid film may be approximately 2 Å thick. The lateral resolution of the inventive SPFM is $(2 D R)^{1/2}$.

The sample rests on a piezoscanner 10. Power supply 12 is used to apply a DC voltage between the probe tip 2 and the counter electrode 4. If an AC signal is used, an AC signal generator 14 is used in place of the power supply. In that case, the AC signal is referenced to a lock in circuit 16 that is interposed between a preamp detector circuit 18 and the SFM electronics and computer analysis circuitry 20.

As is discussed in detail below, there are many ways to map or image the sample surface. By way of example, deflection of an optical signal is shown in FIG. 1. A laser 22 emits a parallel light beam 24 which is reflected off the back of an cantilever 26 holding the probe tip 2. The tip is scanned across the sample surface and responds to variations in the atomic force field of the sample surface, either under constant force or under constant distance conditions. The cantilever, in turn, is deflected, and the light beam is reflected off at an angle proportional to the cantilever deflection. The reflected light, which is proportional to the atomic force field of the sample surface, is detected by a quadrant photodiode array 28. Set up and use of photodiode arrays for this purpose is extensively discussed in *Scanning force Microscopy* by Dror Sarid, Oxford University Press, 1991. The photodiode signals are received by a preamp 18, before analysis by the SFM electronics and computer analysis 20. If an ac signal generator is used, the signal from the preamp 18 is referenced to the lock-in circuitry 16 before analysis by the computer 20.

Turning now to FIG. 2, a schematic diagram of the inventive SPFM probe tip assembly is shown set up to measure a liquid film sample 8 on an insulating substrate 7. The substrate sits on the counter electrode 4. The substrate is approximately 10,000,000 Å thick. The liquid film is typically only 2 Å thick. The SPFM probe tip is made of an electrically conducting material or is coated with an electrically conducting material. In the set-up illustrated in FIG. 2 the probe tip serves as an electrode. In measuring liquids the tip cannot approach the sample closer than about 50 Å. At about 50 Å attractive van der Waals forces cause the fluid to "jump" to the tip, interfering with imaging. Typically the distance, D, between the tip and a liquid sample surface is about 200 Å.

Electrical polarization forces are induced in the sample by applying a voltage to the conductive SPFM probe tip with respect to the counter electrode. Commonly the counter electrode is connected to electrical ground. The probes can be purchased from commercial vendors with tip diameters between about 100 Å and about 500 Å. The strong electric field around the charged probe tip induces a polarization charge distribution on any nearby surface of conductive or insulating materials. Because of the long-range nature of electrostatic interactions, the force can be detected at distances of several hundred angstroms from the surface.

When d is much less than the radius of the probe tip R, the strength of the electric field between the probe and the counter electrode is approximately $\Delta V/d$; the lateral resolution is approximately $(2 d R)^{1/2}$.

In contrast, in the present invention, the distance between the probe tip and counter electrode, d, is much greater than R. The field near the probe tip is approximately $\Delta V/R$. The electric field strength is almost unaffected by changes in d or by the shape or location of the counter electrode. For example, if the probe tip radius is 30 nm and d is 1000 $\mu$m, an increase of a few 1000 $\mu$m in d will only slightly affect the measured electric field strength at a given point in space. By placing the counter electrode farther away from the probe tip, one can measure fields due to electrostatic charges on thick insulator samples located between the probe tip and a counter electrode. The sample can be tens of thousands or tens of millions of times thicker than R. It can be even thicker. The distance, D, between the probe tip and the top surface of the sample is less than R and much less than d. The inventive SPFM is used to image the surface of a thick dielectric sample with a lateral resolution of approximately $(2 D R)^{1/2}$ instead of approximately d, where D is the distance between the probe tip and the sample and d is the distance between the probe tip and the counter electrode.

The present invention enables imaging a new class of samples at nm resolution, including, for the first time, imaging of liquid films.

The present invention comprises a novel probe tip assembly for a microscope that measures the forces of interaction between a charged probe tip and any sample. The key feature that distinguishes the inventive microscope is that the probe tip is used for a first electrode and its counter electrode is located at a distance that is at least the probe-tip radius, or more, away from the probe tip. In one embodiment the probe tip electrode is located 3 times the probe tip radius away from the counter electrode. In another, equally useful, embodiment the probe tip electrode is located 9 times the probe-tip radius away from the counter electrode. The counter electrode can be located centimeters or meters away from the probe tip. In fact just how large the distance is of little importance once it exceeds at least one times the probe tip radius. It is the concentrated field at the apex of the probe tip that induces a polarization force in the sample. The sample can comprise electrically conducting or electrically insulating material. Further more, the sample can be thick or thin. That is, the sample thickness can easily exceed tens of thousands angstroms. Importantly, the sample can be a solid or a liquid. In contrast, other scanning force microscopes and methods of imaging with electrostatic forces were limited to thicknesses of several hundred Å.

The inventive microscope can be used to induce polarization in the sample by the following methods:

a) applying a dc, or constant, voltage to the conductive probe tip or to the counter electrode, or both (dc mode imaging);

b) applying an ac voltage to the conductive probe tip or to the counter electrode, or both (ac mode imaging); Ac mode imaging was used to explore local dielectric properties. If the frequency is above half the mechanical resonance of the probe tip lever, (typically 10–100 KHz), the root mean square average electrostatic force is measured. If the frequency is below half the mechanical resonance of the probe tip lever, the amplitude of the lever oscillation can also be measured.

c) mechanically oscillating the lever at a fixed frequency (vibration mode imaging). The oscillation frequency must be below the mechanical resonance of the probe tip lever. This can be done by shaking the probe tip support or by using an ac bias voltage to mechanically vibrate the probe tip. The tip is vibrated by applying a voltage to a piezoelectric actuator, attached to the tip probe tip or to the sample. It is important in this mode to avoid operating at the mechanical resonance of the system. Induced charge on the substrate will modulate the vibration amplitude. The image is constructed by measuring the variation of the vibration amplitude.

For any of the operating modes described above, the image can be constructed by measuring:

1) the force necessary to maintain a constant distance (D) between the probe tip and the surface of the sample; or 2) the change in distance, D, between the probe tip and the surface of the sample necessary to maintain a constant parameter control signal. For example, for mode a) above, as the probe tip was scanned across the sample, the change in D that resulted in a constant deflection of the cantilevered probe tip was measured.

Measurements using the inventive SPFM were made by, applying a voltage to a conductive AFM probe tip with respect to a remote counter electrode. This induced electrical polarization forces in the sample to be imaged. The polarization force from the induced electrostatic field was then detected at distances of several hundred angstroms from the sample surface. The tip to sample surface distance D was determined by measuring the displacement of the cantilever that was necessary to bring it in contact with the sample when no voltages were applied and both probe tip and substrate were electrically neutral. For a homogeneous sample, like many liquids are, topographic images of the liquid surface can be obtained by measuring the probe-tip cantilever displacement while maintaining the polarization force constant through feedback control of the probe tip-sample distance. Using a commercial RHK STM-100 unit and the inventive imaging method, a vertical resolution of ~0.5 Å was obtained, corresponding to a force sensitivity of about 25 picoNewtons (pN). The lateral resolution can vary between 0.001 $\mu$m and a few $\mu$m. Working with the stiffer of commercially available cantilevers can yield a lateral resolution of 0.005 $\mu$m. Using Digital Instruments, Inc., $Si_3N_4$ cantilevers, having a force constant of 0.58 N/m, a lateral Resolution of 0.02 μm was obtained. With this inventive imaging technique, the structures formed by the condensation and evaporation of water on mica surfaces were imaged. Because polarizability is a material property, when layers of one material are imaged on a substrate of a different material, its apparent height or image contrast is modified by the dielectric constant of the materials being imaged. If the overlayer being imaged has a dielectric constant that is greater than that of the substrate, its apparent height will be greater than its topographic height. Conversely, if the dielectric constant of the material on the surface is smaller, its apparent height will be reduced. As explained in Example 2 below, for molecularly thin layers, the ratio between real and apparent heights can differ by a factor of order 10.

The experiments were performed in a home-built instrument, using light deflection to measure the bending of a lever sensor caused by probe tip-surface forces (W. F. Kolbe, D. F. Ogletree, and M. B. Salmeron, Ultramicroscopy 42–44, 1113, 1992). Commercial microfabricated cantilevers of $Si_3N_4$ were used of nominal spring constant of 0.58 N/m. The probe tips were made conductive by evaporating a 50 Å thick layer of Cr, followed by a 100 Å layer of Pt. Evaporation was done using a standard high vacuum evaporator ($10^{-7}$ Torr). The metals were deposited from thermal evaporation sources at about 1 Å/sec deposition rates. The coating can be made from any conducting or semiconducting material having conductivity greater than about 1 ohm-cm. Metallic probe tips can be used as well. The tips were biased to a voltage of a few volts (±1V to ±5V), positive or negative, relative to the microscope ground. However the voltage can vary between about ±100V. This produced attractive forces on any nearby surface of the order of 10 nN at distances of several tens of nanometers. However forces varying between about 0.01 and 100 nN can be used. The AFM was housed in a chamber where the relative humidity (RH) was varied between 10 and 99% at a room temperature of 21° C., by simple introduction of a desiccant material and/or a container with pure water. The temperature of the experiment can be varied between less than 1° K and about 400° K. The pressure can vary between $10^{-14}$ Torr and 100 atmospheres. The pressures and temperatures can be any achievable temperature or pressure necessary for the endpoint. For example, to make images of dry surfaces a pressure of $10^{-7}$ Torr could be used; to image atomically clean surfaces a pressure of $10^{-9}$ Torr would be used.

Nanometer resolution imaging of water constitutes a dramatic demonstration of the capabilities of the technique presented here, which we shall refer to as scanning polarization force microscopy (SPFM). Its success in imaging liquids is due to the fact that the probe tip is far away ($\geq 100$ Å) from the surface, a condition that is essential to minimize the perturbation of the delicate liquid surfaces by van der Waals forces. Using the inventive SPFM method, two 10 μm×10 μm images were obtained of an adsorbed water layer produced by exposing freshly cleaved mica to 35% RH. Both negative (−3 V) and positive (+3 V) bias polarities were used and they produced identical images as expected for a neutral surface. The lateral resolution of these images was ~200 Å and the vertical resolution was about 0.5 Å.

EXAMPLE 1
Method to Image Water Film Using Constant Voltage

A thin water layer of molecular dimensions was adsorbed on mica surface in air was imaged by SPFM. The experiments to image water were carried out at room temperature (about 21° C.) in an environmental chamber housing the AFM. Low humidity was achieved by introducing a desicant material and by flowing dry nitrogen. High humidity was achieved by evaporating water from a beaker. We used commercial $Si_3N_4$ cantilevers with a nominal force constant of ~0.58 N/m, coated with a 100 Å Pt film for electrical conductivity. The mica samples were prepared by cleavage and were typically several tenths of a millimeter thick. Mica is an anisotropic material with an average dielectric constant of 7. The images were taken at a probe tip voltage of ±2 to ±3V, which results in an attractive force of ≈10 nN at a probe tip-surface distance of ~200 Å. The lateral resolution was of the same order. No dependence of the image on the sign of the applied bias was found for electrically neutral surfaces. When the AFM was operated in the usual contact mode in identical humidity conditions, only the mica lattice could be seen. This indicated the strong perturbation of the water film by the probe tip upon contact. In our imaging conditions, no perturbation of the structure of the water film was observed.

Using the inventive imaging method, 2.5 μm by 2.5 μm surface images showed no contrast above the noise level (0.5 Å) immediately after cleavage at 18% humidity. Water is already present at the surface as indicated by the frequency dependence of the polarization force and more directly by perturbing the surface by contact with the probe tip. This contact produced a region depleted of water (the water is removed by the probe tip) which appears as a hole or depression in the image due to the reduction in ε. This hole refills with water after continued exposure to the humid environment.

As the humidity was increased further, domains of a new phase nucleated (denoted phase II) and increased in size. At 40 to 50% humidity, phase II domains covered the surface uniformly. In the images generated, light regions represented phase-I domains and dark regions represented phase-I domains. There were several interesting features of phase II. First was a reversal of contrast indicating that the domains of phase-II water appeared to be ~2 Å "lower" than the surrounding area of phase-I water, as shown in the cursor profile (FIG. 4). The 2 Å height difference corresponded to a reduction in the attractive force of several tens of piconewtons (pN) over phase-II areas, which was small compared to the total attractive force of ~10 nano Newtons (nN). Second, the many islands exhibited polygonal shapes, that is, the edges were found to follow approximately straight lines forming angles of 60° and 120°. By bringing the probe tip into contact with the substrate, the water layer was disrupted and lattice-resolved images of mica were obtained. The epitaxial relation between the water film and the substrate was determined from these images. A preferential orientation of the domain edges along the mica close packed directions, suggesting a crystalline structure for phase-II water, perhaps that of an ice bilayer was observed.

EXAMPLE 2
Drying Process

The process of condensation and evaporation of water on mica by changing the humidity at room temperature was monitored in situ by SPFM. The growth and shrinkage of the thin (molecular dimensions) water layer was seen clearly.

A water film was imaged during the drying process by introducing a desiccant material into the humid chamber. As the humidity decreased from 37% to 21% changes in the water film structure was imaged. During the drying process, holes formed in the phase-II domains. Simultaneous formation of areas of phase-II and phase-I structure was observed. When humidity was above ~25%, formation of holes in the phase-II domains competed with regions occupied by phase-I domains. When humidity had decreased to 18% humidity, phase-II domains disappeared and no further contrast changes in the image were observed.

The phase II regions that appear as the water film evaporates have an apparent height of about 2 Å. This suggests that the water layer thickness was of molecular dimensions. Muscovite mica is composed of layers of $K^+$ ions between aluminum silicate sheets. Mica cleaves along the ion planes to leave $K^+$ ions on each surface. The phase-I structures imaged in this experiment may have included water molecules solvating $K^+$ ions. This interpretation is supported by infrared spectroscopy studies of layered silicates (clays) that show that when the water content is low, the molecules are tied into solvation shells around the intercalated ions. At higher water contents, the formation of non-solvated water (hydrogen-bonded) was observed. After phase-I formation is complete the percent of H-bonded water increases, leading to ordered structures (phase-II) with angular epitaxial relation with the mica lattice. The lower apparent height of phase-II relative to phase-I indicates that the dielectric constant is smaller in the former. Experiments described in example 3, below, indicate that the main contribution to the measured polarization force is from surface ion mobility. The smaller mobility of these ions in phase-II relative to phase-I could result in the observed contrast reversal. As the humidity and the amount of water on the mica surface increase, a phase II formed which appeared lower in the topographic image. This contrast reversal (that is, when more water is present less height is observed) indicated that phase II had a lower dielectric constant that phase I. A reduced ionic mobility is also consistent with a solid or ice-like structure of phase-II.

The images of water film obtained using the inventive SPFM method show that two different phases form during the condensation of water. Phase-I forms at low humidity (up to ~25%). Between ~25% and ~45% RH, a new phase (phase-II) is formed at the expense of the first. The SPFM images show that the new phase forms domains with a reversed contrast relative to phase-I, i.e., the addition of water after saturation of phase-I leads to the formation of new domains that appear lower than the surrounding areas by about 2 Å. This contrast reversal indicates that the dielectric constant, $\epsilon$, of phase-II is lower than that of phase-I ($\epsilon_{II} < \epsilon_I$) by an amount equivalent to a decrease of the polarization force of about 25 pN. This is a small fraction of the ~10 nN attractive force acting on the probe tip at ±3 V at an imaging height of ~200 Å. To compensate for this, the feedback control brings the surface ~2 Å closer to the probe tip.

The domains of phase-II often have polygonal shapes, with edges making angles of 60° and 120°, which seems to indicate a crystalline structure for this phase. In addition, the domain edges were found to be preferentially aligned with the principal crystallographic directions of the mica substrate. This was easily determined by bringing the probe tip in contact with the surface and imaging its lattice as in standard AFM operation.

EXAMPLE 3
Three-dimensional Liquid Structures

Three dimensional liquid droplets of solutions of KOH and water, NaCl and water, $H_2SO_4$ and water, and glycerol and water were imaged by SPFM. The droplet sizes ranged in order of magnitude from nanometers to microns. The droplets were prepared on a solid surface such as mica, graphite, silicon or metal. On graphite, it was found that the liquid droplets preferred to be adsorbed on the steps of the graphite surface. The change of the shapes of those droplets when changing the humidity was also monitored in situ.

Droplets of KOH solution were placed on graphite and the surface topography was imaged using the inventive SPFM method A film of KOH solution was created by placing a large macroscopic drop of millimeter dimensions on the graphite and then removing most of it by gentle contact with a filter paper. The SPFM images showed submicrometer droplets left on the surface decorating the non-flat layer of graphite that are intrinsic to graphite surfaces. The size of the droplets on the same step was approximately constant. This may be due to the capillary break-down of liquid strips around the steps during the last stages of the drying process. Because the chemical potential is the same inside and outside the liquid strip, it broke into droplets of equal radii.

Thus, the invention provides a method to image condensation and evaporation of a water monolayer using the polarization force between a charged SFM probe tip and a surface. The invention makes possible for the first time to image condensed films of liquids on surfaces with nanometer resolution.

The invention further provides a method to apply electrostatic force imaging to surfaces of conducting and insulating materials. The technique requires the use of conductive probe tips. In our example, microfabricated probe tips coated with a thin layer of metal were used. The modulating effect of local dielectric properties on the surface topography was shown. This imaging method, called scanning polarization force microscopy (SPFM), is further used to image the delicate surfaces of liquids. The frequency dependence of the polarizability or dielectric constant of the surface material is imaged using ac voltage.

EXAMPLE 4
Local contact angle measurement of liquid droplets with sizes down to nanometer scale Contact angle measurement has been used as a conventional method to detect the chemical properties on solid surfaces. However, all the classical methods to measure contact angle are in the resolution range above a micron [L. Leger et al, *Rep. Prog. Phys.* (1992) 431–486] and therefore can only give average information about the chemical properties on solid surfaces. SPFM affords a new way to measure contact angle. The advantage of SPFM here is that very small (nanometer scale) droplets can be imaged and contact angle can be measured locally on a solid surface.

In a SPFM image, the three dimensional shape of a liquid droplet on a solid surface can be obtained. The shape is then calibrated by the aid of numerical calculation in order to deconvolute the tip shape contribution and substrate effect. Contact angle can be measured directly from the calibrated shape of the droplet as showing in FIG. 5. The method is valid for value of a less than 90°.

EXAMPLE 5
Effect of Dielectric Constant on the Real and Apparent Height of an Imaged Layer Since polarization induced in the sample varies as a function of dielectric constants of sample materials being imaged, SPFM can be used to map local dielectric constants.

Water adsorbed on mica surface can form ordered or disordered layers and they have different dielectric constants. Ordered water layer has lower dielectric constant than disordered layer in the SPFM images.

The electrostatic force between a conducting sphere and a semiinfinite substrate of dielectric constant, can be calculated exactly by the standard image charge technique (see for example, Jackson, *Classical Electrodynamics,* John Wiley & Sons, New York, 1975). The result is shown in FIG. 6 for several values of $\epsilon$. For a bias V=3 volts, R=500 Å and a distance of 200 Å, the force for a metal substrate ($\epsilon = \infty$) is ~0.65 nN, and for a substrate with $\epsilon = 2$, about 0.1 nN. Few other geometries can be calculated analytically. A conical probe tip with rounded apex can give a value of the force about a factor of 2 larger than that of the sphere of the same radius. Cones with rounded apex are equipotentials of line of charge perpendicular to a dielectric plane and its image charge. They can be used to calculate the force for a very particular probe tip geometry. The detailed shape of the probe tip must be taken into account for a precise calculation of the force (H. W. Hao, A. M. Baro, and J. J. Saenz, J. Vac. Sci. Technol. B 9, 1323; 1991) (S. Watanabe, K. Hane, T. Ohye, M. Ito, and T. Goto, J. Vac. Sci. Technol. B 11, 1774, 1993).

In the case of a film of dielectric constant $\epsilon'$ adsorbed on a substrate of dielectric constant $\epsilon$, an analytical solution, even for a spherical probe tip, is difficult to obtain. However, for a point charge representing the probe tip, the image charge method can be used to find the attractive force applied to the cantilever. The result is:

$$F = Q^2 \left[ \frac{g_1}{(2D)^2} + \sum_{n=0} \frac{(g_1)^n (g_2)^{n+1}((g_1)^2 - 1)}{(2z + 2L + 2nL)^2} \right] \quad (1)$$

where D is the probe-tip to surface distance, L the thickness of the film, $g_1=(\epsilon'-1)/(\epsilon'+1)$ and $g_2=(\epsilon'-\epsilon)/(\epsilon'+\epsilon)$. Using this formula, with the charge set equal to the voltage multiplied by the radius (R), the contrast or apparent height of films when imaged at constant polarization force induced by a point charge was obtained. For R~500 Å and V=3 volts, a 2 Å thick layer of material of $\epsilon'=2$ on mica ($\epsilon=7$) will appear to be 1 Å thick, while for $\epsilon'=80$, the layer will appear to be 5 521 thick. As a general rule, materials with dielectric constants larger than that of the substrate are magnified in the z direction while materials with smaller dielectric constants are demagnified. For a finite probe tip, the forces are larger than predicted by the above formula, as are the apparent heights of the films. The direction of the magnification however, remains unchanged.

The apparent height of materials with high electron or ion conductivity (with $\epsilon'>1000$) was entirely determined by the dielectric properties rather than by the topography. In order to maintain a constant force when using the spherical probe tip shown in FIG. 1, the probe tip height can change on the order of 100 Å when going from a region of $\epsilon=7$ (e.g. bare mica) to a region of $\epsilon\sim\infty$, even if the topographic height is the same.

FIG. 3 shows measurements made of surface charges existing on the sample, rather than induced polarization. The force as a function of tip bias voltage (counter electrode grounded) measured at three different points on a mica sample. The distance between the tip electrode and the counter electrode was about 0.5 mm. The parabolic shape of the curves shows the force due to the polarization of the dielectric mica sample. The highest point on the curve corresponds to the minimum tipsurface electric field. The bias voltage at this minimum is proportional to the surface charge. If this value is zero, the sample has no surface charge.

EXAMPLE 6
Mapping local biological properties

Because most biological properties of biomaterials and bio-macromolecules can be detected by measuring their dielectric properties, SPFM can be used to map local biological properties, like hydrophobic and hydrophilic regions, regions of different ionic concentrations, and regions of differing dielectric constants or surface charges.

EXAMPLE 7
Polarization Forces Using Alternating Voltage

Dielectric constants of materials depend on the frequency of the applied electric field. By applying an alternating voltage to the SPFM tip electrode and varying its frequency, we can measure the local dielectric spectroscopy (that is, the dielectric constant as a function of the ac frequency) of the sample material.

An alternating voltage was applied to the SPFM probe tip from −5 to +5 volts at a rate of 20 Hz. FIG. 7 shows force curves obtained on glass, mica, silicon and graphite substrates. They exhibited the expected parabolic dependence on bias ($\propto V^2$) and the force magnitudes followed the dielectric constants, with graphite showing the largest polarization, and glass the smallest. Additionally, a strong dependence on the rate of change of the bias voltage was observed. When the measurement was performed by changing the voltage very slowly (<<20 Hz), the force on the insulating materials increased and the resulting curves matched that of graphite. In addition, even at 20 Hz, the forces measured for the insulating substrates were larger than expected based on the values of $\epsilon$, which cannot be accounted for by probe tip shape effects. These two observations, 1) large magnitude of the polarization force on insulating substrates; and 2) high sensitivity to bias scanning speed, clearly indicate that the polarization force has a strong contribution from slow processes such as the transport of mobile ions at the surface. In summary, the polarization force on the probe tip varied both as a function of dielectric constant and as a function of the rate of change of alternative voltage frequency.

Surface ions are known to greatly alter the dielectric constant. In the case of layered materials with intercalated ions (clays, smectites, etc.), $\epsilon$ was found to be in the range of 1000–10,000 at low frequency (about 100 Hz) [G. Sposito and R. Prost, Chemical Reviews 82, 553 (1982) and V. Mehrotra and E. P. Giannelis, J. Appl. Phys. 72, 1039 (1992)]. These results indicated that ions contributed approximately the same amount of polarization charge as free electrons in metals. This large value of $\epsilon$ is strongly dependent on the presence of water in the layers because water increases the ionic mobility. The contribution from mobile ions to the surface dielectric constant of insulators dominates the contribution from the electronic or dipolar orientation of water.

EXAMPLE 8
Frequency Dependent Images

The dielectric spectroscopy of various materials such as glass, mica, NaCl, silicon, organic monolayer and graphite in different environments such as under changing the humidity, were measured by SPFM. Each material exhibited a unique dielectric spectroscopy and the same material exhibited a different spectroscopy when the environment changed. Thus, using dielectric spectroscopy, for example, ice can be distinguished from water.

The frequency dependence of the polarization force was studied by applying an alternating voltage to the probe tip. Since the force was the same for + and − bias, the lever oscillates at twice the driving frequency. The results, as a function of relative humidity, are shown in FIG. 8A for mica and in FIG. 8B for glass substrates. The sharp increase at 27 kHz was due to the mechanical resonance of the cantilever at 54 kHz. For each RH value, the force was ~13 nN at the lowest frequencies (at a probe tip-sample distance of ~2000 Å and an amplitude of 10 V). It dropped to ~1.5 nN when the frequency was above some cut-off value. On mica in dry conditions (20% RH), this cut-off value was as low as 1 Hz.

At 40%.RH, it was around 40 Hz and, at 99% RH, when the water film thickness was approximately 20 Å (according to ellipsometric results), the cut-off frequency was 1 kHz. Experiments were conducted to 1 Mhz. Below the resonance peak at 27 kHz, both the oscillation amplitude of the lever or its average dc deflection was measured. Above that frequency, only the dc component was measured. The residual force of ~1.5 nN extended at least up to 1 Mhz.

Below the frequency cut-off of FIGS. 8A and 8B, polarization was dominated by mass transport processes of ions over the surface with a distribution of response times, the cut-off corresponding to the average response time of this distribution. Above this cut-off, dipolar orientation and electronic contributions became more important. When the frequency range was above 1 Mhz, a contrast reversal between phase-I and phase-II was observed. This could be due to a decreased ionic mobility in phase-II, which, in turn, might be related to its crystalline structure. The addition of frequency dependence imaging gives a spectroscopic character to the SPFM technique that is useful in studies of the dielectric structure of liquid films and surfaces.

EXAMPLE 9

Method to Image the Corrosion Process $H_2SO_{4(4)}$ / Al

Atmospheric corrosion of acid on metal surfaces in urban and industrial environments is a very complicated phenomenon including many chemical and physical processes at the solid/liquid/gas interface. Information obtained from classical methods are all at bulk level which may not be sufficient to help understand this phenomenon. Using SPFM, the corrosion process was observed directly for the first time. Local chemical reactions, in situ, images were made with nanometer resolution.

Chemical reactions at solid-liquid-gas interface such as occurs in atmospheric corrosion processes was observed in situ using SRFM. Specifically, sulfuric acid induced corrosion of $Al/Al_2O_3$ surface was studied in situ with SPFM. A new mechanism that explains the humidity effect on the corrosion rate was discovered based on this direct observation (paper in preparation).

In an earlier paper, Q. Dai et al reported the results of in-situ infrared reflection absorption (IRAS) experiments on the sulfuric acid-induced corrosion of thin Al films (Q. Dai, A. Freedman and G. N. Robinson, *J. Electrochem. Soc.,* in press). Hydrated aluminum sulfate was identified as the principal product of the corrosion reaction. The rate of corrosion, taken as the rate of appearance of hydrated aluminum ions and sulfate ions, was found to be strongly dependent on the ambient relative humidity. At 30% relative humidity (RH), the corrosion rate remained low and constant over time, whereas at 80% RH and above, more than a fivefold increase in the corrosion rate was observed over a similar time interval. It is evident from these results that high humidity indeed promotes corrosion. However, a complete understanding of the humidity effect requires a more complete knowledge of the liquid-solid interface, which is very difficult to extract from the IR studies alone.

The aluminum samples were prepared by vapor depositing 2000 Å thick Al films on polished Si wafers. The average roughness of the films was 20 Å. Since the wafers were exposed to air for several months prior to these experiments, the Al films were oxidized. X-ray photoelectron spectroscopy measurements indicated that the thickness of the native oxide layer was 20–30 Å, in accord with published results (T. Gesang, R. Hoper, S. Dieckhoff, D. Fanter, A. Hartwig, W. Possart and O. -D. Hennemann, *Appl. Surf. Sci.* 84, 273 (1995), and references therein.). Prior to use, the aluminum samples were rinsed with acetone and deionized water.

Sulfuric acid was deposited on the oxidized aluminum surface by first depositing a macroscopic droplet and rapidly dispersing it using a jet of gas. This produced submicrometer-sized acid droplets The initial concentration of sulfuric acid used in these experiments ranges from 20–98 wt. %. However, the acid droplets equilibrate rapidly with the ambient water vapor. At a fixed temperature, their final concentration depends solely on the relative humidity. For example, at a temperature of 298K and a relative humidity of 30%, the concentration of sulfuric acid is 55 wt. % and, at 90% RH, it is 20 wt. % (J. F. Perry, ed., *Chemical Engineers' Handbook* (McGraw-Hill, 1950), p. 168.) Thus, in order to control the concentration of the droplets, the SPFM measurements were performed in a humidity-controlled box. On the time scale of our experiments, there is no concentration gradient across the droplets.

In order to examine the influence of relative humidity on the corrosion process, SPFM images of sulfuric acid droplets on Al were acquired while first raising the ambient relative humidity above 90% and then decreasing it below 20%. Following deposition of the acid droplets, the sample was immediately imaged with SPFM at intervals of 10–15 minutes at ~30% RH. For a period of two hours, little change was observed in acid droplets. The ambient humidity in the SPFM compartment was then allowed to increase, reaching an equilibrium value of 94% RH in 30 minutes. SPFM images taken during this period showed a significant increase in the size of the acid droplets. The observed increase in size is presumably due to the absorption of water by the sulfuric acid as it reached its equilibrium concentration at high humidity (20 wt. % at 90% RH). Corrosion reactions between the acid and the substrate might have taken place to a limited extent as well.

After 30–60 minutes at RH >90%, the acid droplets underwent a dramatic morphological change. After reaching maximum swelling, the droplets suddenly spread and coalesced. Separate contact-mode AFM experiments have verified that this spread layer is a liquid. We believe that the spreading reflects the onset of aluminum corrosion, in accord with earlier IRAS studies, in which a rapid increase in the corrosion rate was observed at 80% RH after an induction period. Contact angle measurements showed that dilute sulfuric acid droplets have larger contact angles and wet the Al surface less than concentrated acid droplets, so we can rule out changes in wettability with acid concentration as a source of the spreading. In addition, in separate experiments performed on vapor deposited gold, which does not react with sulfuric acid, the acid droplets only swelled and did not spread over a two-hour period at 90% RH.

To confirm that corrosion had taken place, we reduced the relative humidity in order to precipitate hydrated aluminum sulfate, identified as the principal product of sulfuric acid-induced corrosion of aluminum in earlier IRAS experiments. The surface was then probed with contact-mode AFM. Since only solid surfaces can be imaged in contact-mode because liquid layers are displaced by the probe tip, it is possible to distinguish solid hydrated aluminum sulfate from unreacted liquid sulfuric acid.

The contact-mode AFM image of roughly the same region, was taken at an ambient relative humidity of 20%. (SPFM images taken at intermediate relative humidities, which are important for understanding the corrosion process, will be presented later) A 200 Å-high polycrystalline precipitate layer was observed. In contrast to the comparatively rough (20 Å) original surface, the surface of the precipitate is smooth with a roughness of about 5 Å (with the exception of several large holes). Based on earlier IRAS studies carried out under similar experimental conditions, we believe that this precipitate is indeed hydrated aluminum sulfate produced from the reaction of sulfuric acid with aluminum.

The contact AFM image also reveals holes that penetrate the salt layer down to the underlying aluminum substrate. In fact, these holes are filled with liquid, as evidenced by non-contact SPFM and contact AFM images, respectively. These images were taken sequentially on the precipitate layer at 20% RH. The bumps in the SPFM image indicating that the holes in the precipitate layer are filled with liquid. During contact-mode imaging, the liquid is displaced by the probe, revealing the holes. We believe that these liquid-filled holes are formed as a result of a phase separation between the liquid sulfuric acid and solid aluminum sulfate that occurs during the drying process. SPFM images taken as the relative humidity was lowered from 94% RH to 20% RH indicate the formation of new liquid droplets. The image was taken at 90% RH where a uniform phase was formed as a result of corrosion-induced spreading of the acid droplets. As the relative humidity was decreased to 79%, small droplets formed. The number and size of these droplets continued to increase as the relative humidity decreased further to 32%. The droplets remained liquid even at relative humidities below 20%, strongly suggesting that they were not composed of hydrated aluminum sulfate. We believe that these droplets consist of unconsumed sulfuric acid that phase-separated from aluminum sulfate during the drying process. At high relative humidity, the salt and the acid are both liquid and are intermixed. However, as the humidity is lowered, the salt precipitates, leading to a segregation of the liquid acid and the solid salt.

Although our observations indicate that the sulfuric acid-aluminum system is quite complex and that more detailed studies are necessary to fully understand the underlying corrosion mechanisms, a model that explains the influence of relative humidity on the corrosion rate can be proposed, based on these SPFM and AFM studies. At low relative humidities, the principal corrosion product, hydrated aluminum sulfate, is solid-like. It acts as a diffusion barrier between the sulfuric acid and the aluminum substrate, and prevents further corrosion. Indeed, we observed very little change in the morphology of the acid droplets at relative humidities <30%. Any reactions that took place are locally confined. The phase separation observed between the acid droplets and the salt layer at low relative humidities strongly suggests that the salt layer inhibits further corrosion once it precipitates. At high relative humidities, on the other hand, aluminum sulfate forms a liquid solution. Sulfuric acid can better intermix with and permeate the salt layer and reach the underlying substrate, where further reaction can occur. The fluid sulfate solution may also wet the surface better and thus help lateral diffusion of sulfuric acid on the surface. The two processes likely assist each other, and the corrosion reaction can proceed rapidly once some critical relative humidity is reached. This model is further supported by IRAS studies in which a large amount of unconsumed sulfuric acid was observed on Al at 30% RH at the end of the exposure period, implying that the solid precipitates inhibited further corrosion, whereas little sulfuric acid was detected at 80% RH after the same exposure period.

EXAMPLE 10

Mapping local chemical properties

The method of detecting chemical information about materials based on measuring their dielectric properties has been widely used in research and industry such as that in chemical sensors [H. D. Wiemhofer, Solid State Ionics 75 (1995) 167–178]. Since SPFM can map the local dielectric constants, it was used to map local chemical properties.

A surface containing two different chemical functional regions of OTE (octadecyltriothoxysilane) monolayer which is hydrophobic and APS (aminopropyltrimthoxysilane) which is hydrophilic were imaged by SPFM. The two regions were distinguished by SPFM. At high humidity, the APS region gave out a higher contrast than OTE region.

Mica was cleaved in air and dipped very quickly into the OTE solution. If the dipping time is within 5 seconds, we usually got a mica surface partially covered by OTE islands. This OTE-partially-covered mica was then put into the APS solution for sufficient time. APS molecules would be adsorbed onto the empty mica surface. Finally we got a surface containing two kind of region: OTE region which was hydrophobic and APS which was hydrophilic.

In a normal contact AFM image at humidity of about 90%, OTE regions are higher than APS since OTE molecule is longer than APS. However, in the polarization images OTE are lower than APS under both positive and negative tip bias. This result can only be attributed to the dielectric constant effect: APS has a higher dielectric constant than OTE in this condition and even though the real height of APS is smaller than that of OTE, the dielectric constant of APS is high enough to give out a higher contrast in polarization images. APS is hydrophilic and OTE is hydrophobic. Usually hydrophilic surface usually have high surface dielectric constant.

The enhancement of the dielectric constant by the existence of water adsorbed on APS was decreased when the water vapor was decreased. We lowered the humidity and monitored the contrast change in SPFM images. Above 40% in this sample, APS islands kept a higher contrast than OTE islands. If the humidity was decreased to about 27%, the contrasts changed; the OTE islands looked a little higher in SPFM images. At 14%, it was seen clearly in SPFM images that the OTE islands were higher.

EXAMPLE 11

Contamination—weakly bound materials on solid substrate, such as the fine particles adsorbed from the air environment Usually contaminants on solid surfaces are weakly bound on the substrate and they can be easily swept away in normal AFM contact mode. Even though conventional non contact mode AFM using van der Waals attractive force can be used to image these contaminates, it is not possible to get a stable image if the contaminates contain some liquids. The non contact imaging of SPFM can be used to measure these contaminates without stability problems. In addition, SPFM can afford more information of the contaminates such as their charge condition and dielectric properties.

Fine contamination particles adsorbed on mica surface were observed by SPFM. Charged particles could be distinguished by comparing the contrasts under positive and negative tip bias. For example, a positive charged particle gave out a lower apparent height under positive bias than that under negative bias. Some particles which had lower dielectric constant than mica surface were distinguished by SPFM because they gave out a lower contrast than mica substrate under both negative and positive tip bias.

Mica was cleaved and left in air for above 12 hours and observed by SPFM. Many fine particles with sizes from nanometer to micrometer could be seen in SPFM images. They were easily swept away by normal contact AFM imaging. Charged particles could also be distinguished by comparing the contrasts under positive and negative tip bias. For example, a positive charged particle exhibits a lower apparent height under positive bias than that under negative bias. Some particles which had lower dielectric constant than mica surface could also be distinguished by SPFM because they exhibited a lower contrast than mica substrate under both negative and positive tip bias.

EXAMPLE 12
Manipulation of liquid droplets

If the SPFM tip is very close to the liquid droplet and the tip bias is sufficiently high (depends on the drop sizes), the attractive force between the tip and the droplet can be increased high enough to move the liquid on the solid surface.

Water droplets have been manipulated by SPFM to form artificial patterns on both insulator or conductor surfaces. A controlled wetting process of glycerol inside a micron ditch on graphite surface has been achieved by SPFM A drop of roughly 10 $\mu$l of 2 Molar KOH water solution was deposited onto a freshly cleaved surface of HOPG. Droplets were formed by immediately placing filter paper on the surface, allowing the solution to disperse, and then removing the filter paper. In the case of mica, the drop was blown by a compressed gas to form small droplets on the surface.

In a series of scanning, the first image was obtained with a tip bias of +6V and a constant force of 20 nN between the tip and surface. All the droplets imaged remained stationary. During imaging, the tip is rapidly scanned back and forth in the x-direction at a speed 20 $\mu$m/s, and slowly scanned along the y-direction (0.04 $\mu$m/s). In the second image, the constant force was increased to 22 nN with the same tip bias while scanning (scanning speed: 10 $\mu$m/s in x and 0.02 $\mu$m/s in y), three of the droplets moved with the tip along the slow scan direction, resulting in the observed streaks. This phenomenon can be used to manipulate liquid droplets on a surface in the following way: when the gap between the tip and a droplet is reduced, then the tip moves to another position. If the horizontal component of the attractive force between the tip and the droplet is larger than the adhesive force between the droplet and the solid substrate, the droplet will be pulled along with the tip. The force necessary to do this depends upon the size of the droplet. The droplet will stop once the gap is increased to a larger value. An artificial pattern of KOH droplets was formed in this way. Droplets on the mica surface can also be manipulated.

EXAMPLE 13
Depositing materials on solid surfaces, especially on insulator surfaces Scanning tunneling microscopy(STM) sometimes used to deposit materials on solid surfaces at the atomic scale is limited to conductive surfaces.

Since there is a strong electric field existing around the aperture of the new inventive SPFM tip, materials on the tip were deposited onto the sample substrate by applying a high voltage pulse. The deposition works on insulating as well as conducting substrates. Atomic scale materials were deposited on a mica surface using the SPFM method and apparatus.

Mica was freshly cleaved and imaged by SPFM. In the beginning, the mica surface is very flat in both noncontact SPFM images and normal AFM images. The cantilever was from Digital Instrument with a force constant of 0.58 N/m. The lever was coated with a thin layer of Pt about 300 Å.

We touched the mica surface with the biased tip quickly and imaged again. It was found that a bump was formed at the touching point, indicating that some stuffs were deposited on mica surface. Normal contact AFM imaging also showed that there were some materials deposited on the surface. Generally, higher tip voltage gave out larger bumps. In this case, we didn't find any deposition for zero tip voltage. This suggested that the deposition was not produced by only mechanical effect. The voltage we used by now was in the range of about 3V to about 10V. It seemed that there was a threshold voltage for this kind of deposition. Below the threshold, we could not find any deposition on the mica surface. The threshold were different for different tips and sometimes changed during the deposition processes. In many cases, we couldn't get deposition even at 10V tip bias.

EXAMPLE 14
Imaging the surfaces of bulk liquids, and organic films on Liquid surfaces SPFM can also be used to image the surfaces of bulk liquids. In principle, there is no difference to do this from that in thin liquid films or small liquid droplets (see example 1 and 2 above). The difference is that the bulk liquid surface is naturally unstable. By carefully isolating the vibration from the environment and using small amount of liquids, however, it's possible to obtain SPFM images.

Stable images have been obtained on surfaces of thick sulfuric acid layer and glycerol layer, approximately microns thick. These layers behave as bulk liquids.

A drop of about 5% water solution of $H_2SO_4$ was deposited on mica surface and allowed to dry in air. In the final stage of drying, a layer of $H_2SO_4$ was observed by eye on the mica surface. The thickness of this $H_2SO_4$ layer was between about 10 and about 100 $\mu$m which we could treat it as bulk liquid. The layer thickness was roughly estimated by bringing the sample to the tip and recording the sample positions of the first dropping point of the cantilever induced by the contacting with the liquid surface and the repulsive point induced by the contacting with the solid substrates. The difference between the two points is approximately the thickness of the liquid films. The sample was then imaged by SPFM. In a noncontact mode with a tip—sample distance above 300 Å, stable images could be obtained but the surface looked like very flat and we could not find any structures on it. The experiment shows that the bulk liquid surface can be imaged stably by SPFM.

EXAMPLE 13
Modifying sample surfaces by strong electric field around the SPFM tip Many physical, chemical and biological processes are influenced by strong electric fields nearby. A biased SPFM tip is used as a tool to modify a sample surface locally, for examples to influence the biological activity of a cell membrane surface.

If a microwave ac voltage is applied on the SPFM tip, it acts as a nano-microwave probe to modify hydrated materials.

EXAMPLE 15
Imagine under a liquid media

If the media between the tip and sample surface is not vacuum or air but liquids, SPFM is still able to take a polarization image. In this case, the polarization force is decreased by the screen effect of liquid media but still detectable by SPFM.

EXAMPLE 16
Imaging the structures inside materials

Using a high alternating voltage frequency on the probe tip so that the surface dielectric constant does not dominate, the structures underneath the surface of sample will make a contribution to polarization force. Under these experimental conditions, SPFM is used to image the structures inside materials. Image reconstruction method, such as that used in tomography, is used to resolve the image.

The description of illustrative embodiments and best modes of the present invention is not intended to limit the scope of the invention. Various modifications, alternative constructions and equivalents may be employed without departing from the true spirit and scope of the appended claims.

Having thus described the invention, what is claimed is:

1. A method for using scanning force microscopy to image nonconducting materials using polarization force microscopy comprising the steps of:
   a) placing a nonconducting sample having a thickness greater than the radius of an electrically conducting scanning microscope probe tip between the tip and its counter electrode;
   b) applying a voltage to the probe tip relative to the counter electrode;
   c) moving the probe tip to the sample surface until a deflection of the probe tip is detected;
   d) scanning the surface of the sample with the probe tip;
   e) measuring an electrical signal arising at the probe tip as it scans the sample surface; and
   f) converting the electrical signal arising at the probe tip to an image.

2. The method of claim 1 wherein the sample thickness is between about three times the probe tip radius and about 5 centimeters.

3. The method of claim 1 wherein the sample thickness is between about nine times the probe tip radius and about 5 centimeters.

4. The method of claim 1 wherein the sample thickness is between 5,000 Å and 1,000,000,000 Å.

5. The method of claim 1 further comprising a constant-force method to image nonconducting materials using polarization forces further comprising the steps of:
   a) selecting the force level for scanning the sample;
   b) turning on an electrical feedback control system to maintain the probe tip-sample separation distance so that a constant force is maintained; and
   c) constructing a map of the variation in the distance between the probe tip and the sample that is required to maintain constant force on the probe tip.

6. The method of claim 1 further comprising a constant-distance method to image nonconducting materials using polarization forces comprising the steps of:
   a) obtaining an approach curve to determine the force as a function of distance between a scanning-microscope-probe-tip fulcrum and a sample;
   b) choosing a separation distance between the fulcrum and the sample with its corresponding force value;
   c) maintaining a constant distance between the fulcrum and the surface while scanning the surface;
   d) measuring the deflection of the cantilever portion of the probe tip during the scan;
   e) converting the deflection of the probe tip to an image.

* * * * *